Sept. 23, 1958     F. O. CHURCH     2,853,115
INNER TUBES FOR TIRES
Filed May 14, 1953     3 Sheets-Sheet 1

INVENTOR.
FRANKLIN O. CHURCH
BY
Benj. T. Rauber
ATTORNEY

Sept. 23, 1958

F. O. CHURCH 2,853,115

INNER TUBES FOR TIRES

Filed May 14, 1953

INVENTOR.
FRANKLIN O. CHURCH
BY Benj. T. Rauber
ATTORNEY

INVENTOR.
FRANKLIN O. CHURCH
BY Benj. T. Rauber
ATTORNEY 2,853,115

INNER TUBES FOR TIRES

Franklin O. Church, Buffalo, N. Y., assignor to Dunlop Tire and Rubber Corporation, Buffalo, N. Y., a corporation of New York Application May 14, 1953, Serial No. 354,990

16 Claims. (Cl. 152—342)

My present invention relates to inner tubes for tires having within the inner tube a safety tube of reinforced rubber to support the tire casing in the event of a puncture or blow-out. The invention relates more particularly to the construction of the safety tube.

Safety tubes have heretofore been proposed or used either as a part of an inner tube or as an independent safety tube of a tire sealed to the rim and requiring no inner tube. In each case the safety tube comprised a fabric reinforced rubber sheet extending in an arch spaced from the tread portion of the tire from the inner surface of one side of the tube or tire carcass or casing to the other side of the tube or casing to divide the space within the tire or casing into two compartments.

In the case of a tubeless tire the edges of the safety tube were secured and sealed to bead rings.

In either case the safety tube formed two compartments, one between the safety tube and the tire carcass, which would be subject to the effects of a puncture or blow-out, and the other, within the safety tube which is protected from a puncture or blow-out and which, therefore, served to support the tire casing from complete collapse at least for a limited period of time.

A slow transfer of air from within the safety tube to the space outside is provided for to enable the pressure on both compartments to be equalized or approximately equalized under normal operation.

The safety tube walls, while reinforced with fabric, should be light and flexible.

The tubes have not, therefore, been of sufficient stiffness to hold them in their fully expanded shape nor can centrifugal force be relied upon for this purpose. I have found that the safety tubes may buckle from their molded shape when the tire is inflated. This buckling may take the form of re-entrant or inwardly bending arches extending around the circumference of the safety tube.

When the tire is punctured or a blow-out occurs, such distortion or arcing from the true position of the safety tube may result in a loss of effective pressure within the safety tube, thus permitting a greater drop in the rolling radius of the wheel as the load is transferred from the casing to the safety tube.

Moreover, the lack of stability in the fabric reinforced safety tube permits it to shimmy or wobble within the casing, which is undesirable when the wheels are rotating at high or moderately high speeds.

These various disadvantages are obviated by my present invention which provides a safety tube of a tire or inner tube having a stiffening element which holds the safety tube to its vulcanized shape and enables it to be used without wobble or shimmy and yet provides the necessary resilience and buoyancy to act as a support for the tire casing in the event of a puncture or blow-out.

In the safety tube of my invention I provide a stiffening element of thin spring wire or other resilient stiffening material which extends from one side of the safety tube to the other. This wire is shaped to hold the safety tube in its inflated or rounded position within the tire casing. It is of sufficient stiffness relative to the thickness and weight of the safety tube to avoid shimmying or wobbling when the wheel is rotated at high speeds. Also it maintains the safety tube fully inflated under all conditions so that in the event of a puncture or blowout the safety tube will maintain the effective pressure and diameter for which it is designed. The resilient spring does not, however, affect the resiliency of the safety tube when acting as a support for the tire casing.

The various features of my invention are illustrated, by way of example, in the accompanying drawings in which—

Figure 1:
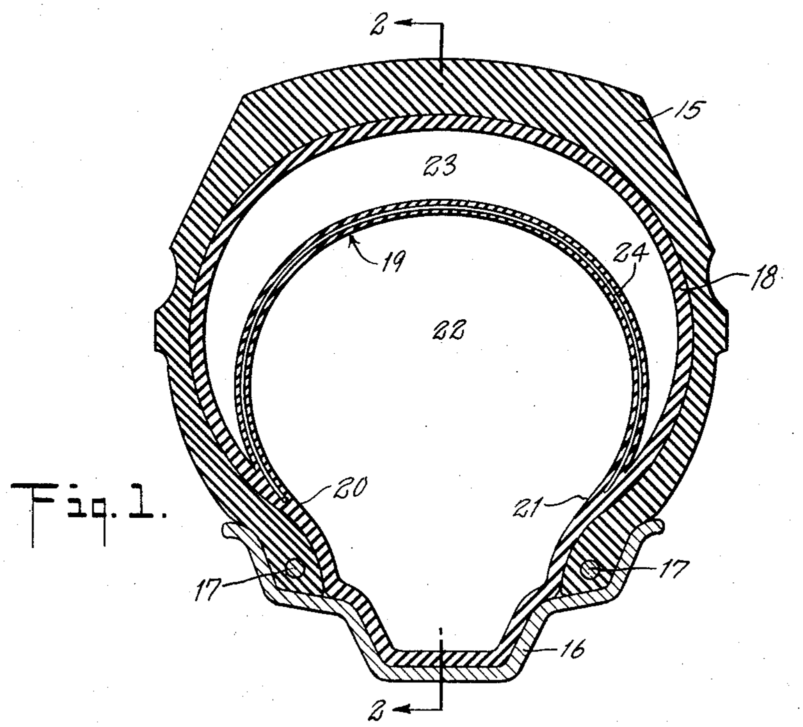
Fig. 1 is a radial section of a tire having an inner tube and safety tube embodying the invention.

Referring more particularly to Fig. 1, the invention is illustrated as embodied in a tire comprising an outer tire casing 15 mounted on a suitable tire rim 16. The detail construction of the tire casing is not illustrated except that the beads 17 are shown in their customary place.

Within the tire casing is a tube 18 which may be of the usual construction. Within the inner tube 18 is a safety tube 19 vulcanized or otherwise joined to the inner tube 18 at its two side edges 20 and 21 immediately above the tire beads 17. The safety tube is arched outwardly to form a safety inner space 22 and an outer space 23 between the safety tube and the inner tube.

It will be apparent that upon a collapse by puncture or blow-out of the inner tube and tire casing the casing will rest upon the safety tube which, therefore, should be inflated to the maximum amount sufficient to leave an adequate safety space 23.

The safety tube is formed of reinforced rubber, preferably of two-ply cord fabric.

Figure 2:
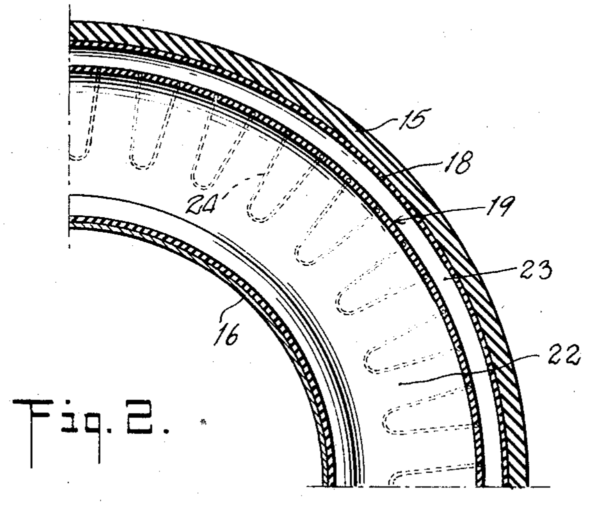
Fig. 2 is a section taken on the median plane of the tire and tubes of Fig. 1.

Also incorporated in the wall or adjacent to the wall of the safety tube is a stiffening element 24 of thin flexible spring wire or other spring material of sufficient stiffness to maintain the safety tube arched or inflated, as indicated in Fig. 1. This wire may be bent backwards and forwards from the lines 20 and 21 in successive loops as indicated in Fig. 2. Its primary purpose is to stiffen and hold the safety tube in its arced shape and to prevent it from swinging or swaying excessively due to vibration or movements of the tire.

Figure 3:
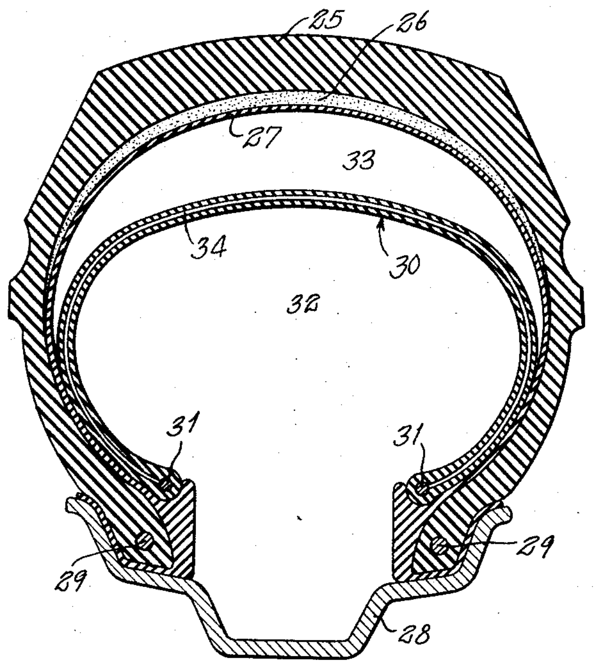
Fig. 3 is a cross-section similar to that of Fig. 1 showing another embodiment of the invention as applied to a tubeless tire.

In the embodiment as shown in Fig. 3, the safety tube is applied to a tire having no inner tube. In this construction the tire casing 25 is lined with a puncture sealing material 26 in the tread portion and with a lining 27 to hold the air or retard its passing into the tire casing. The lining and puncture sealing material extend throughout the inner surface of the tire casing nearly to the well 28 of the rim on which the tire casing is held by beads 29. Preferably they are bonded or cemented to the casing.

A safety tube 30 is provided with a pair of beads 31 immediately above the tire beads 29 to enclose a space 32 within the safety tube, and sealed to the wall 28 and a space 33 between the safety tube and the inner surface of the tire casing. This safety tube need not be bonded permanently to the wall 27.

Loops of stiffening wire 34 are embedded in the fabric reinforced wall of the safety tube and are anchored to the beads 31.

In this embodiment there is no pressure controlling valve between the spaces 32 and 33. All that is needed is a slow or restricted transfer of air from one space to the other inasmuch as the reinforcing wire holds the safety tube in proper position. This slow leak or transfer may be accomplished by any of the means known in the art.

Figure 4:
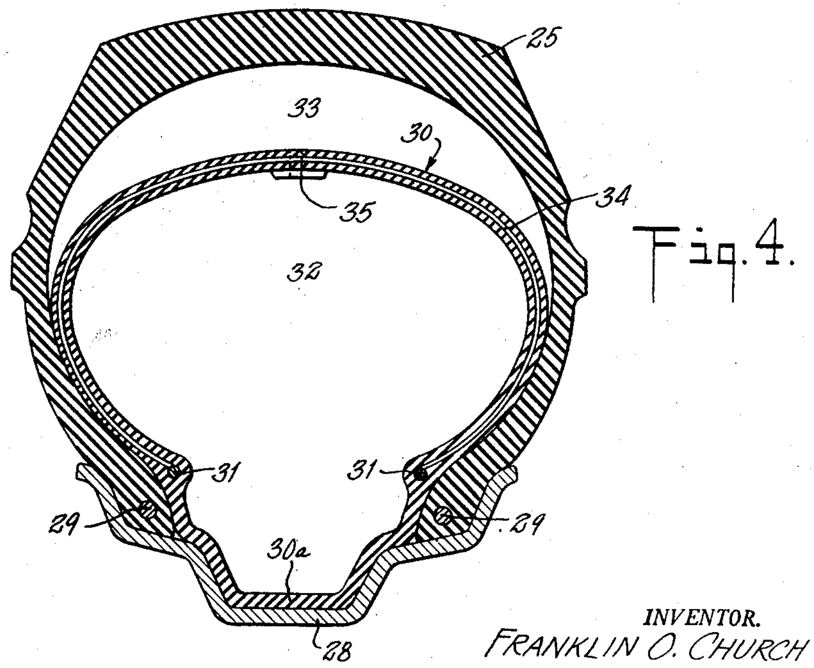
Fig. 4 is a section similar to that of Fig. 1 showing an embodiment of the invention for tubeless tires.

The embodiment shown in Fig. 4 is similar to that of Fig. 3 but omits the puncture sealing material and provides a valve 35 to hold a slightly greater pressure in the space 32 than in the space 33. In this embodiment also the tube extends into the well of the rim as indicated at 30*a* to make a completely enclosed safety tube. The numerals in this embodiment are similar to the numerals for the similar parts shown in the embodiment in Fig. 3.

Figure 5:
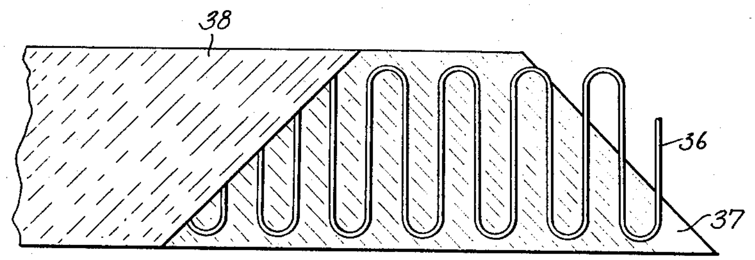
Fig. 5 is a sketch showing the manner in which the spring wire is placed between a pair of cord plies used to form the safety tube.
Figure 6:
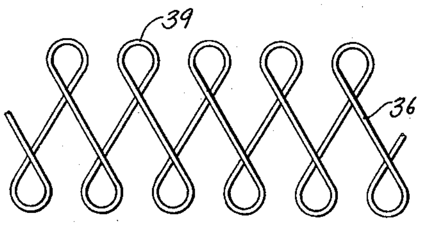
Fig. 6 shows another modification of the arrangement of the stiffening wires.

The reinforcing wire for the various embodiments of the invention may be incorporated in the safety tube in various ways. As shown in Fig. 5 a spring wire 36 is doubled back and forth in a flat plane and placed between two unvulcanized cord fabrics 37 and 38 in which the direction of bias or slope of the cords in one fabric are at an angle or reverse to those of the other. The assembled structure may then be shaped and mounted within an inner tube, in the manner shown in Fig. 1, and vulcanized with the inner tube. The wire may, however, be folded in loops as shown at 39 in Fig. 6 instead of as shown in Fig. 5 and incorporated between plies of reinforced fabric.

Figure 9:
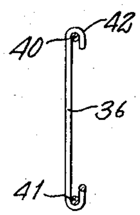
Fig. 9 is a cross-section of the arrangement shown in Fig. 8.
Figure 7:
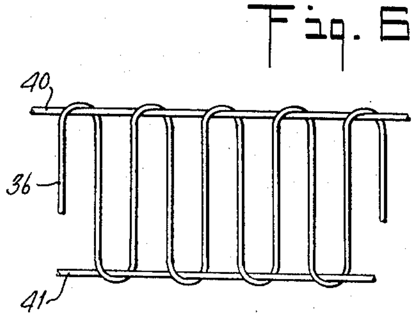
Fig. 7 shows the arrangement of stiffening wires relative to the tube beads.
Figure 8:
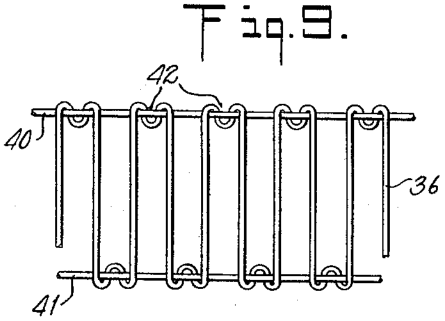
Fig. 8 shows another modification of the arrangement of stiffening wires relative to the tube beads.

Fig. 7 shows a method of looping the reinforcing wire 26 about a pair of parallel spaced beads 40 and 41. The structure thus formed may then be placed between the plies of cord fabric as in Fig. 5 and the assembly shaped and vulcanized to provide a safety tube of the type shown in Figs. 3 and 4. Or, as shown in Figs. 8 and 9, the reinforcing wire may be bent backwards and forwards in folds as in Fig. 5 and the bights of these folds may be hooked over the bead wires 40 and 41, as indicated at 42.

Figure 10:
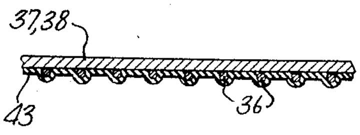
Fig. 10 is a section of the tube taken transversely of the stiffening wire.

Instead of placing the reinforcing wires between the plies of fabric they may be mounted as shown in Fig. 10 on one face of the reinforcing fabric 37, 38 and covered and attached to the fabric by a sheet 43 of vulcanizable stock. The strip or sheet of assembled structure may then be shaped and vulcanized as described above. In this case the fabric 37, 38 may be a square woven fabric.

Figure 11:
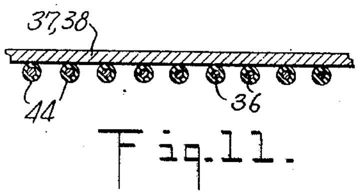
Fig. 11 is a cross-section of another construction of stiffening wires and reinforced fabric.

As shown in Fig. 11 the wire may be covered with a vulcanizable rubber composition 44 placed at one side of the fabric reinforced rubber sheet, then shaped and vulcanized.

When the safety tube or an inner tube having a safety tube of my invention is mounted in the tire casing the safety tube is spaced from the tread portion of the tire and is, therefore, not subjected normally to the flexing which the casing undergoes and, therefore, there is substantially no bending of the reinforcing wires. These wires may, however, be of sufficient resiliency to receive occasional flexing or flexing incident to the mounting of the safety tube without being permanently deformed.

Upon deflation of the casing and the space within the casing and outside of the safety tube the safety tube will support the casing for a limited period of time during which the wires may be flexed but without necessarily deforming them permanently.

The wires may be made of any suitable metal or alloy, such as steel, or may be made of any suitable plastic of sufficient stiffness and resiliency or of a cord stiffened with a plastic. They may be made of any suitable cross-section or structure.

Having described my invention, what I claim is:

1. A safety tube for pneumatic tires which comprises a continuous sheet of fabric reinforced rubber arched to extend within and spaced from a tire casing from one bead portion of said tire casing to the other and having a resilient stiffening reinforcement of filaments placed crosswise of the circumference of the tube and spaced circumferentially of the tube extending throughout said arched sheet from one bead portion to the other to hold said sheet of reinforced rubber arched upwardly, the filaments of said reinforcement being united integrally with said reinforced rubber and being stiffer than said reinforcing fabric.

2. The safety tube of claim 1 in which said reinforced sheet is reinforced with two-ply fabric and in which said stiffening element is incorporated between said plies.

3. The safety tube of claim 2 in which said stiffening reinforcement comprises loops of spring wire.

4. An inner tube for pneumatic tires having an outer wall and an inner safety tube secured to said inner tube and comprising a sheet of fabric reinforced rubber secured to the wall of said inner tube and extending from one wall to the opposite wall in an arc spaced from the wall of said inner tube, said safety tube having a reinforcement of resilient wire extending in successive circumferentially spaced loops.

5. A safety tube for pneumatic tires which comprises a pair of spaced tire beads, a continuous arched sheet of fabric reinforced rubber secured to and arching outwardly between said tire beads and having a passage to permit the slow passage of air from the interior of said safety inner tube, and a resilient stiffening reinforcement of spaced filaments extending transversely between said beads integral with said arched sheet and shaped to hold said sheet of reinforced rubber arched outwardly between said beads, said filaments being stiffer than said reinforcing fabric.

6. The safety tube of claim 5 in which said stiffening reinforcement is a spring wire extending in transverse lengths between said beads.

7. The safety tube of claim 5 in which said reinforced rubber sheet is a fabric reinforced sheet.

8. The safety tube of claim 5 in which said reinforced rubber sheet is reinforced by cord fabric.

9. The safety tube of claim 5 in which said reinforced rubber sheet is a two-ply cord sheet and in which said stiffening reinforcement is a spring wire between said cord plies extending transversely back and forth between and anchored to said beads.

10. The safety tube of claim 9 in which said spring wire is anchored about said beads.

11. An inner tube for pneumatic tires which comprises a casing tube of rubber, a safety tube within said casing tube comprising a pair of spaced beads at the inner surface of said casing tube, a continuous sheet of fabric reinforced rubber secured to and arching outwardly between said beads to a distance short of the inner surface of said casing tube to form an inner and an outer space within said tube and a resilient stiffening reinforcement of spaced filaments extending transversely between said beads integral with said arched sheet of reinforced rubber and arched outwardly between said beads, the filaments of said reinforcement being stiffer than said fabric reinforcement.

12. The inner tube of claim 11 in which said stiffening reinforcement is a spring wire extending in transverse lengths between said beads.

13. The inner tube of claim 11 in which said reinforced rubber sheet is a fabric reinforced sheet.

14. The inner tube of claim 11 in which said reinforced rubber sheet is reinforced by cord fabric.

15. The inner tube of claim 11 in which said reinforced rubber sheet is a two-ply cord sheet and in which said stiffening reinforcement is a spring wire between said cord plies extending transversely back and forth between and anchored to said beads.

16. The inner tube of claim 15 in which said spring wire is anchored about said beads.

References Cited in the file of this patent

UNITED STATES PATENTS

| | | |
|---|---|---|
| 1,633,963 | Weigel | June 28, 1927 |
| 2,224,066 | Shore | Dec. 3, 1940 |
| 2,524,808 | Khalil | Oct. 10, 1950 |
| 2,554,815 | Church | May 29, 1951 |
| 2,665,731 | Slezak | Jan. 12, 1954 |
| 2,712,339 | Hurt | July 5, 1955 |

OTHER REFERENCES

Tires Service Station, page 36, vol. XXXII, No. 7, February 1951.